United States Patent
Ramarge et al.

(10) Patent No.: US 9,543,745 B2
(45) Date of Patent: Jan. 10, 2017

(54) ARRESTER BYPASS DEVICES

(71) Applicants: Michael M. Ramarge, Olean, NY (US); Jeremy L. Martin, Friendship, NY (US); Jonathan J. Woodworth, Boynton Beach, FL (US); Timothy S. Smith, Fuquay Varina, NC (US)

(72) Inventors: Michael M. Ramarge, Olean, NY (US); Jeremy L. Martin, Friendship, NY (US); Jonathan J. Woodworth, Boynton Beach, FL (US); Timothy S. Smith, Fuquay Varina, NC (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 422 days.

(21) Appl. No.: 13/965,334

(22) Filed: Aug. 13, 2013

(65) Prior Publication Data

US 2015/0049405 A1 Feb. 19, 2015

(51) Int. Cl.

| | |
|---|---|
| *H02H 9/00* | (2006.01) |
| *H02G 13/00* | (2006.01) |
| *H02H 9/04* | (2006.01) |
| *H02H 7/24* | (2006.01) |
| *H01T 4/08* | (2006.01) |
| *H01H 39/00* | (2006.01) |

(52) U.S. Cl.
CPC ............ *H02G 13/80* (2013.01); *H01H 39/004* (2013.01); *H01H 39/00* (2013.01); *H01T 4/08* (2013.01); *H02H 7/24* (2013.01); *H02H 9/043* (2013.01)

(58) Field of Classification Search
USPC ................................................ 361/54, 75, 57
See application file for complete search history.

(56) References Cited

U.S. PATENT DOCUMENTS

| | | | |
|---|---|---|---|
| 3,755,715 A | 8/1973 | Klayum et al. | |
| 6,633,009 B1 | 10/2003 | Shea | |
| 6,657,150 B1 | 12/2003 | Shea et al. | |
| 6,839,209 B2 | 1/2005 | Shea et al. | |
| 2010/0089739 A1* | 4/2010 | Filiputti et al. ............. | 200/82 R |

(Continued)

FOREIGN PATENT DOCUMENTS

| | | |
|---|---|---|
| DE | 102008013447 A1 * | 9/2009 |
| EP | 1610432 A2 | 12/2005 |

OTHER PUBLICATIONS

The International Search Report and Written Opinion from Corresponding PCT Application No. PCT/US2014/049346, Mailed Dec. 11, 2014 (7 sheets).

*Primary Examiner* — Ann Hoang
(74) *Attorney, Agent, or Firm* — King & Spalding LLP

(57) ABSTRACT

An arrester bypass device can include a switch having an normal state and an operated state. The arrester bypass device can also include a first electrode mechanically coupled to the switch, where the first electrode is held when the switch is in the normal state and released when the switch is in the operated state. The arrester bypass device can also include a second electrode positioned in line with the first electrode, wherein the first electrode contacts the second electrode when the switch is in the operated state. The arrester bypass device can further include a ground strap having a first end and a second end, where the first end is mechanically coupled to the plunger, and where the second end is mechanically coupled to an electrical ground.

14 Claims, 9 Drawing Sheets

(56) References Cited

U.S. PATENT DOCUMENTS

2011/0186547 A1* 8/2011 Ren ............................... 218/123
2011/0222199 A1 9/2011 Ludewig et al.
2013/0033796 A1 2/2013 Shea

* cited by examiner

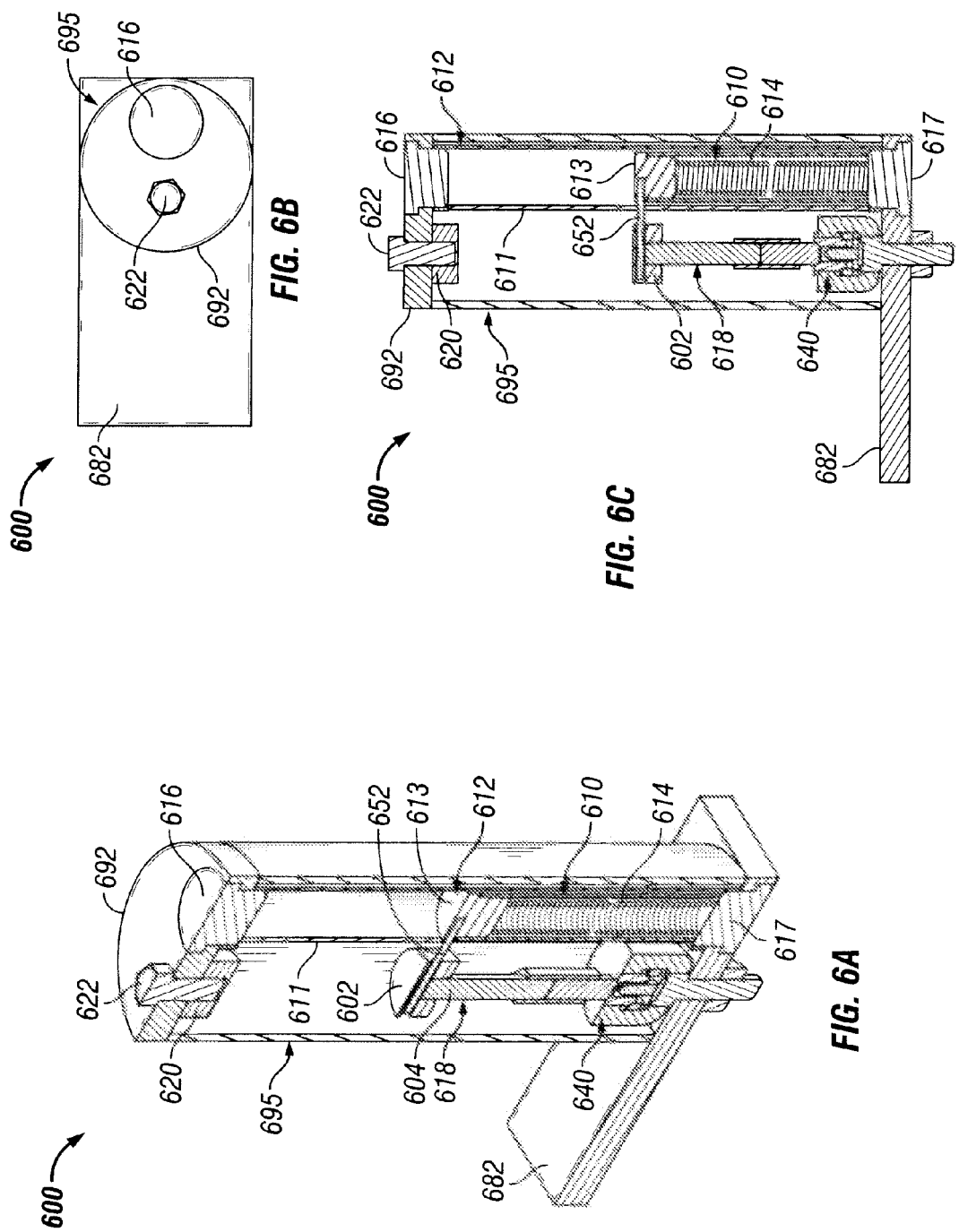

ARRESTER BYPASS DEVICES

TECHNICAL FIELD

Embodiments described herein relate generally to arresters, and more particularly to systems, methods, and devices for bypassing an arrester during a fault current.

BACKGROUND

An arrester (sometimes called a lightning arrester or a surge arrester) is a device used on electrical power systems and telecommunications systems to protect the insulation and conductors of the system from the damaging effects of lightning and other fault currents. A typical arrester has a high-voltage terminal and a secondary terminal. When a power surge (fault current) travels along the power line to the arrester, the current from the surge is diverted through the arrestor, in most cases to earth (ground, also called an electrical ground). If protection from the arrester fails or is absent, a power surge on the electrical system can introduce thousands of kilovolts that may damage transmission lines and/or cause severe damage to transformers and other electrical or electronic devices.

When a fault current flows through an arrester, damage can still occur. If too much fault current flows through an arrester, the arrester itself, electrical connections to the arrester, and/or devices proximate to the arrester can explode and/or catch fire. In some locations where arresters are used, one or more of a number of objects that are located proximate to an arrester can catch fire when a fault current flowing through an arrester causes a fire and/or explosion.

SUMMARY

In general, in one aspect, the disclosure relates to an arrester bypass device. The arrester bypass device can include a switch having a normal state and an operated state. The arrester bypass device can also include a first electrode mechanically coupled to the switch, where the first electrode is held when the switch is in the normal state and released when the switch is in the operated state. The arrester bypass device can also include a second electrode positioned in line with the first electrode, where the first electrode contacts the second electrode when the switch is in the operated state. The arrester bypass device can further include a first ground strap comprising a first end and a second end, wherein the first end is electrically coupled to the second electrode, and wherein the second end is electrically coupled to an electrical ground. The switch can change to the operated state upon detecting a fault current flowing through an arrester. The fault current bypasses the arrester when the plunger is in the actuated position.

In another aspect, the disclosure can generally relate to a system for bypassing an arrester during a fault current. The system can include an arrester comprising a high-voltage terminal and a secondary terminal. The system can also include an arrester bypass device mechanically coupled to the secondary terminal of the arrester and to the top member. The arrester bypass device can include a switch having a normal state and an operated state. The arrester bypass device can also include a first electrode mechanically coupled to the switch, where the first electrode is held when the switch is in the normal state and released when the switch is in the operated state. The arrester bypass device can also include a second electrode positioned in line with the first electrode, wherein the first electrode contacts the second electrode when the switch is in the operated state. The arrester bypass device can further include a ground strap comprising a first end and a second end, wherein the first end is electrically coupled to the second electrode, and wherein the second end is electrically coupled to an electrical ground. The switch can change to the operated state upon detecting the fault current flowing through the arrester. The fault current can bypass the arrester when the plunger is in the actuated position.

In another aspect, the disclosure can generally relate to a method for bypassing an arrester. The method can include detecting, at a switch, a fault current flowing through the arrester. The method can also include changing, based on the fault current, the switch from a normal state to an operated state. The method can further include releasing, in response to the switch changing to the operated state, a first electrode mechanically coupled to the switch. The first electrode, when released, contacts a second electrode, where the fault current is diverted from the arrester through the first electrode, the second electrode, and a ground strap, where the ground strap is electrically coupled to an electrical ground.

These and other aspects, objects, features, and embodiments will be apparent from the following description and the appended claims.

BRIEF DESCRIPTION OF THE DRAWINGS

The drawings illustrate only example embodiments of arrester bypass for fault currents and are therefore not to be considered limiting of its scope, as arrester bypass for fault currents may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 6A-6C shows various views of another example arrester bypass device in accordance with certain example embodiments.

DETAILED DESCRIPTION OF EXAMPLE EMBODIMENTS

Figure 1:
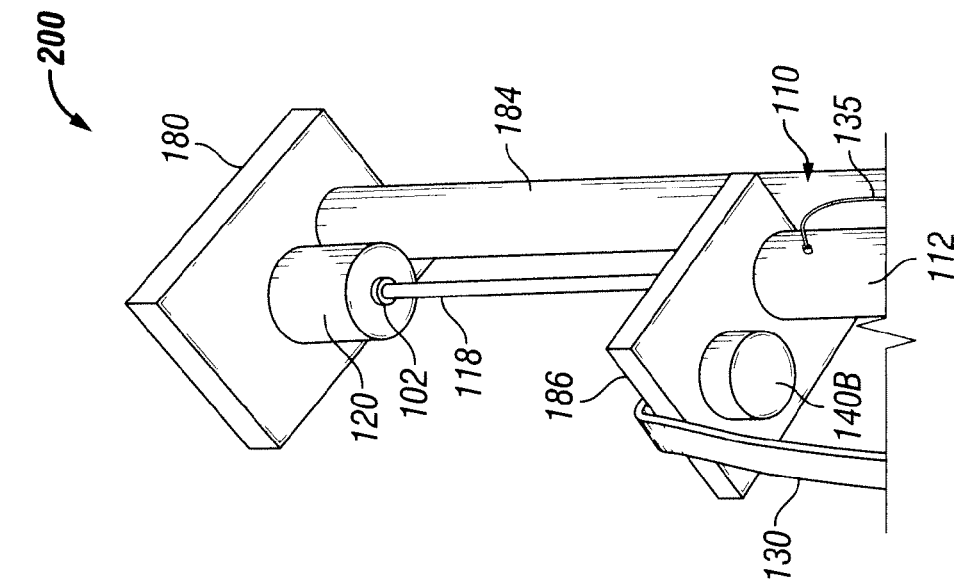
FIG. 1 shows an example arrester bypass device in a suppressed position in accordance with certain example embodiments.

The example embodiments discussed herein are directed to systems, apparatuses, and methods of bypassing an arrester. While the Figures shown and described herein are directed to bypassing an arrester, other types of electrical devices can also be bypassed using example embodiments described herein. Thus, example arrester bypass devices described herein are not limited to an arrester.

In one or more example embodiments, an arrester or similar electrical protection device is subject to meeting certain standards and/or requirements. For example, the International Electrotechnical Commission (IEC) sets standards, such as IEC 60099-4 Ed 2.2 (2009) that applies to metal-oxide surge arresters without gaps for alternating current (AC) systems, with which an arrester must comply to be used in field applications. As another example, Standards Australia sets standards, such as AS1307.2 (1996), with which an arrester must comply to be used in field applications. Examples of other entities that set standards and/or requirements for arresters is the Institute of Electrical and Electronics Engineers (IEEE) and the California Department of Forestry and Fire Protection (Cal Fire).

Because of the increase in drought conditions that arise in various parts of the world year after year, the possibility of fires, often leading to catastrophic results, has increased. As a result, some standards have become more strict with respect to arresters and other similar electrical devices. Specifically, some standards require that the risk of a spark or flame caused by an arrester in mitigating a fault current be greatly reduced or eliminated. Example embodiments can be used to meet these standards by quickly bypassing the arrester and diverting a fault current directly to ground (electrical ground), thus reducing or eliminating the chance that sparks generated at the arrester and/or debris (e.g., pieces of the arrester) that are heated from the fault current will reach grass, weeds, and/or other elements that can catch fire upon contact.

In normal operating conditions, an arrester acts as an insulator. When a fault condition occurs, generating a fault current, the arrester conducts and allows the fault current to flow therethrough. As described herein, a fault current (also called, among other commonly known names, a power surge, or simply a fault), is an electrical disturbance associated with a fault condition that falls outside of normal operating conditions and can lead to damage of electrical equipment if not contained and controlled. A fault current can be caused by one or more of a number of conditions, including but not limited to a lightning strike, a mechanical breakage, excessive heat, an open circuit, and putting power too close to ground.

A user as described herein may be any person that is involved with the removal, installation, and/or maintenance of arresters or other electrical devices. Examples of a user may include, but are not limited to, a company representative, an electrician, an engineer, a mechanic, an operator, a consultant, a contractor, and a manufacturer's representative.

The components of example arrester bypass devices described herein can be physically placed in outdoor environments. Thus, the components of example arrester bypass devices can be subject to extreme heat, extreme cold, moisture, humidity, high winds, dust, and other conditions that can cause wear on such components. In certain example embodiments, the components of example arrester bypass devices, as well as any mechanical coupling between such components, are made of materials that are designed to maintain a long-term useful life and to perform when required without mechanical failure.

Example embodiments of bypassing an arrester will be described more fully hereinafter with reference to the accompanying drawings, in which example embodiments of bypassing an arrester are shown. Bypassing an arrester may, however, be embodied in many different forms and should not be construed as limited to the example embodiments set forth herein. Rather, these example embodiments are provided so that this disclosure will be thorough and complete, and will fully convey the scope of arrester bypass devices to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

Figure 2:
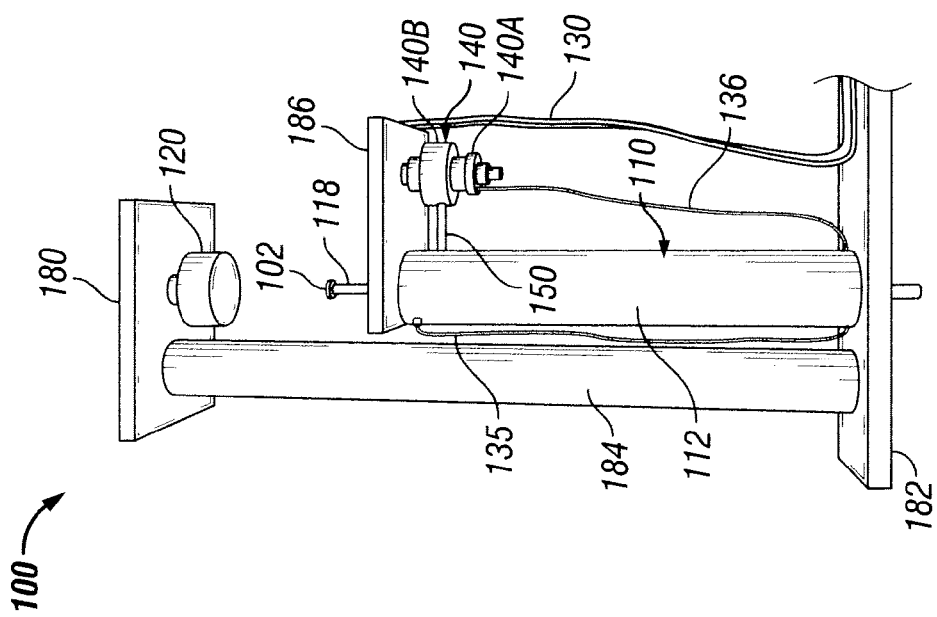
FIG. 2 shows the arrester bypass device of FIG. 1 in an actuated position in accordance with certain example embodiments.

FIGS. 1 and 2 show example arrester bypass devices 100 and 200, respectively, in accordance with certain example embodiments. Specifically, FIG. 1 shows the arrester bypass device 100 in a normal (prior to operation) state, while FIG. 2 shows the arrester bypass device 200 in a post-operation state. In one or more embodiments, one or more of the components shown in FIGS. 1 and 2 may be omitted, added, repeated, and/or substituted. Accordingly, embodiments of an arrester bypass device should not be considered limited to the specific arrangements of components shown in FIGS. 1 and 2.

Referring to FIGS. 1 and 2, the arrester bypass devices 100 and 200 can include a switch 140, a switch mechanism 110, a conductive strap 130, a ground strap 135, a ground strap 136, an electrode 120, an optional expendable trigger 150, a support device 184, a support plate 186, a base member 182, and a top member 180 (all of which can be called components of the arrester bypass device 100). The switch mechanism 110 can include a plunger 118 disposed, at least in part, within the housing 112 of the switch mechanism 110. The switch 140 is mechanically coupled to the switch mechanism 110, and the switch mechanism 110 is mechanically coupled to the electrode 120 when the plunger 118 is in the actuated position, as shown in FIG. 2.

In certain example embodiments, the switch 140 detects a fault current and activates the arrester bypass. The switch 140 is used to generally describe a device that detects a fault current flowing through the arrester and, based on the detection of the fault current, changes state to operate the bypass device. The switch 140 can have a normal state (the term used herein for the state of the switch 140 in a normal operating condition) and an operated state (the term used herein for the state of the switch 140 has detected a fault condition). The switch 140 can have a first end and a second end, where the first end receives a fault current (as from the conductive strap 130) and the second end is electrically coupled to ground (as with the ground strap 136). Recognition of the fault current flowing from the first end to the second end of the switch 140 causes the switch 140 to change from a normal state to an operated state.

In the normal state, as shown in FIG. 1, the switch 140 does not trigger or activate the arrester bypass. In other words, the switch 140 remains neutral. The switch 140 can detect the fault current based on one or more of a number of factors. Examples of such factors can include, but are not limited to, current, voltage, pressure, frequency, and temperature. The switch 140 can detect the fault current using one or more measuring devices. Examples of such measuring devices can include, but are not limited to, a meter (e.g., ammeter, voltmeter), a pressure sensor, a frequency counter, and a thermometer. The switch 140 can detect the fault current through the conductive strap 130 (defined below), by being in proximity to the arrester, through some other suitable means, or any combination thereof.

Generally speaking, the switch 140 can be a type of release mechanism that releases (directly or indirectly) the plunger 118 (or, more specifically, the electrode 102 disposed at the distal end of the plunger 118) when a certain condition is met (in this case, when a fault current is detected flowing through the arrester). The switch 140 can be configured in one or more of a variety of forms. For example, the switch 140 can be a relay with a coil (positioned between the first end and the second end) that energizes. In response to the energized coil, the switch 140 can change the state of a contact (e.g., from open (normal state) to closed (operated state)). As another example, and as shown in FIGS. 1-10, the switch 140 can be a disconnector. In such a case, the switch 140 includes a detonator that detonates based on a range of currents for a given frequency. One or more discrete components (e.g., capacitors, inductors, resistors) and/or integrated circuits can be part of, or electrically coupled to, the switch 140 to control the conditions under which the detonator of the disconnector (or any other aspect of a different switch 140) detonates.

If the switch 140 is a disconnector, the switch 140 can have an unprimed cartridge located in the vicinity of a sparkgap, which is oriented in parallel with some type of electrical grading component (e.g., an electronic capacitor, an electronic resistor, a conductive polymer, a high-wattage resistor). In such a case, during a fault condition, a voltage drop that occurs across the grading component can cause a heat buildup, thus igniting the cartridge. In certain example embodiments, the switch 140 can break into multiple pieces when the disconnector (or other part of the switch 140) detonates. The switch 140 can be subject to one or more of a number of standards and/or regulations. Examples of such standards and/or regulations can include, but are not limited to, IEEE Standard C62.11-2012 and IEC 60099-4 (2009, ed. 2.2).

When the switch 140 detects a fault current, the switch changes from the normal state to an operated state. In the operated state, as shown in FIG. 2, the switch 140 activates the arrester bypass. Specifically, the switch 140 releases the electrode 102. In this particular embodiment, the switch 140 causes the switch mechanism 110 to actuate, which forces the electrode 102 (sometimes referred to herein as the first electrode) toward the electrode 120 (sometimes referred to herein as the second electrode). In this case, when the switch changes from the normal state to the operated state, the switch detonates and breaks into multiple pieces. The top end 140B (also called the first piece 140B) remains affixed to the support plate 186, while the bottom end 140A (also called the second piece 140A) physically separates from the first piece and remains mechanically and electrically coupled to the ground strap 136 (not shown). If there is a trigger 150, than the switch 140 causes the trigger 150 to actuate the switch mechanism 110. The trigger 150 can be part of the switch 140, or the trigger 150 can be a separate component that is operably (e.g., mechanically) coupled to the switch 140. In certain example embodiments, the switch 140 is electrically coupled to ground, as with a ground strap.

As described above, the trigger 150 can be optional and, if present, can be expendable. The trigger 150 can be made from one or more of a number of materials, including but not limited to wood, plastic, metal, and ceramic. In certain example embodiments, the trigger 150 couples to the switch 140 at one end and to the switch mechanism 110 at the other end. The trigger 150 can be designed and configured to react to the switch 140 changing to the operated state, which in turn causes the switch mechanism 110 to actuate. When the trigger 150 is coupled to the switch mechanism 110 in a normal state (when the switch 140 is in the normal state), the trigger 150 maintains the plunger 118 in a suppressed position. When the trigger 150 is no longer coupled to the switch mechanism 110 (when the switch 140 is changing to the operated state), the trigger 150 releases the plunger 118 to an actuated position.

As an example, if the switch 140 is a disconnector, the detonation of the detonator can cause the trigger 150 to break, melt, become deformed, disintegrate, move, become dislodged, and/or otherwise change position relative to the switch mechanism 110. When this occurs, the switch mechanism 110 becomes actuated. In this example, as shown in FIG. 2, the trigger 150 falls away (with or without breaking) from both the switch 140 and the switch mechanism 110. When this occurs, the plunger 118 is released to the actuated position. For instance, the switch 140 can change from the normal state to the operated state based on a temperature of the switch 140 by detonating when the temperature of the switch 140 exceeds a threshold temperature. When the switch 140 changes to the operated state, the trigger 150 can break apart.

In certain example embodiments, the optional switch mechanism 110 houses the plunger 118. As stated above, the switch mechanism 110 can hold (with the assistance of the optional trigger 150) the plunger 118 (and, thus, the electrode 102) in a suppressed position when the switch 140 is in the normal state, and releases the plunger 118 (and, thus, the electrode 102) to an actuated position when the switch 140 is in the operated state. The switch mechanism 110 can include one or more components that move the plunger 118 into the actuated position. For example, the switch mechanism 110 can include a spring, where the spring is held under compression when the plunger 118 is in the suppressed position. The spring can be released when the switch 140 changes to the operated state, and the plunger 118 can move into the actuated position by the spring when the spring is released as shown in FIG. 2. An example of a spring-based switch mechanism 110 is described below with respect to FIG. 3.

In certain example embodiments, the optional plunger 118 can help provide an alternative path for the fault current to flow, away from the arrester. The plunger 118, if any, can be made of an electrically conductive material and protrude through a top side of the optional switch mechanism 110. The plunger 118 can be sized to withstand the fault current without melting, breaking, becoming deformed, or otherwise failing to provide the alternative path for the fault current. In certain example embodiments, the electrode 102 can be part of the plunger 118.

Figure 4:
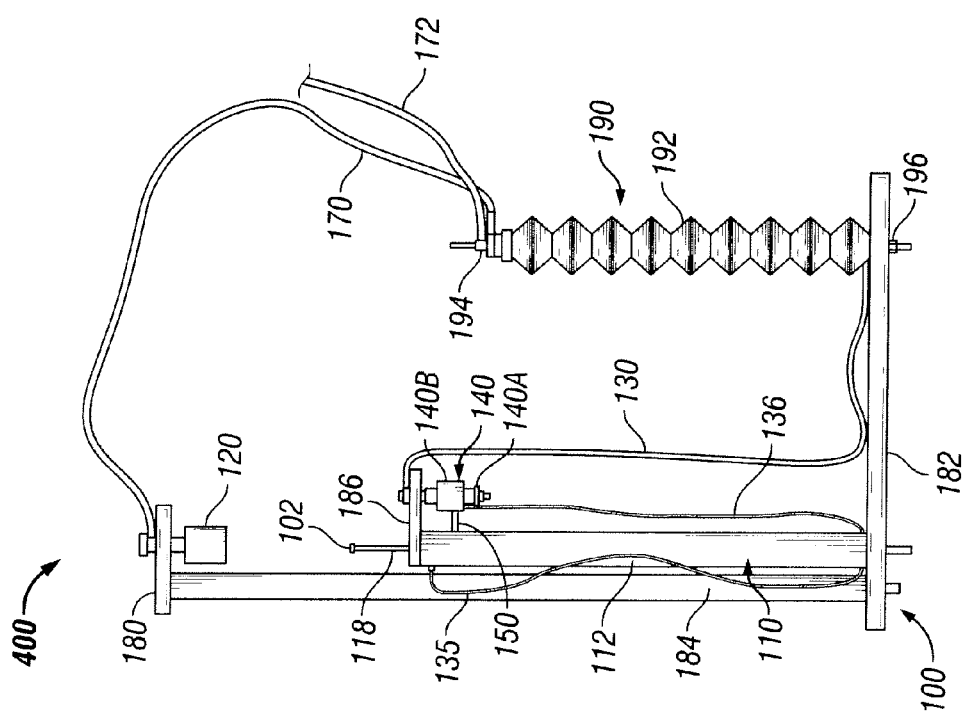
FIG. 4 shows a system for bypassing an arrester in accordance with certain example embodiments.

When the plunger 118 is released into the actuated position, the electrode 102 disposed at the distal end of the plunger 118 comes into contact with the electrode 120 as shown in FIG. 2. In other words, the electrode 120 is positioned in alignment with the electrode 102 (in this particular case, above the switch mechanism 110). In certain example embodiments, the electrode 120, like the electrode 102, is made of electrically conductive material. The electrode 120 can be electrically coupled to a source (e.g., conductor, busbar) along which the fault current travels. The electrode 120 is also electrically coupled to a high-voltage terminal of an arrester, as shown in FIG. 4 below. The electrode 120 can be mechanically coupled to (mounted on) the top member 180, which can also be made of an electrically conductive material. The top member 180 can be part of, or a component separate from but mechanically coupled to, the arrester bypass device 100.

In certain example embodiments, the electrode 120 is positioned a distance from a top of the plunger 118 when the plunger 118 is in the suppressed position, as shown in FIG. 1. Such a distance can exceed an arc-over threshold distance between the electrode 102 positioned at the distal end of the plunger 118 and the electrode 120. This prevents an arc from being generated, in normal operating conditions (when there is no fault current), between the electrode 102 and the electrode 120 of the arrester bypass device 100 when the switch 140 is in the normal state and when the plunger 118, if any, is in the suppressed position.

When the plunger 118 is released from the suppressed state to the actuated state (after the switch 140 changes to the operated state), the plunger 118 can remain in the actuated position, held against and mechanically coupled to the electrode 120. The top of the plunger 118 can be shaped and sized in such a way as to provide substantial contact with the electrode 120 when the plunger 118 is in the actuated position. For example, as shown in FIGS. 1 and 2, the top of the plunger 118 can be flat and wider than the rest of the plunger 118, ensuring more surface area contact with the electrode 120. By having substantial contact between the electrode 120 and the plunger 118, the fault current can more easily (and reproducibly) be diverted away from the arrester and through the plunger 118.

The conductive strap 130 of the arrester bypass device 100 has a first end that is mechanically and electrically coupled to a secondary terminal of the arrester, and a second end that is mechanically and electrically coupled to a first end of the switch 140. Thus, when the fault current flows through the arrester, the fault current continues to flow from the arrester through the conductive strap 130 to the switch 140. The conductive strap 130 can be sized to withstand the fault current without melting, breaking, becoming deformed, or otherwise failing to provide the alternative path for the fault current. The ground strap 130 can be made of any of a number of electrically conductive materials. Such materials can include, but are not limited to, copper and aluminum.

The ground strap 135 of the arrester bypass device 100 has a first end that is mechanically and electrically coupled to the top side of the switch mechanism 110 (and, more specifically, to the plunger 118). Thus, when the fault current flows from the electrode 120 to the plunger 118, the fault current continues to flow from the plunger 118 to the ground strap 135. The first end of the same or a different ground strap 136 can be mechanically and electrically coupled to the second end of the switch 140. The ground strap 135 can be sized to withstand the fault current without melting, breaking, becoming deformed, or otherwise failing to provide the alternative path for the fault current.

Each ground strap 135, 136 also has a second end, opposite the first end, that is mechanically and electrically coupled to a ground (e.g., an Earth ground). Thus, a fault current can flow through the ground strap 135 to ground. The ground strap 135 can be made of any of a number of electrically conductive materials. Such materials can include, but are not limited to, copper and aluminum.

The support plate 186 of the arrester bypass device 100 can be a platform to which one or more components of the arrester bypass device 100 can be mechanically coupled. For example, as shown in FIGS. 1 and 2, the top end of the switch mechanism 110 and the grounding strap 130 can be mechanically coupled to the support plate 186. In certain example embodiments, the support plate 186 is made of an electrically conductive material. Thus, the fault current flowing through the plunger 118 can flow through the support plate 186 to reach the ground strap 130.

When the top end of the switch mechanism 110 is mechanically coupled to the support plate 186, the support plate 186 can have an aperture that traverses therethrough. In such a case, the plunger 118 can extend through (traverse) the aperture in the support plate 186. Alternatively, a portion of the switch mechanism 110 can extend through (traverse) the aperture in the support plate 186. One or more other components of the arrester bypass device 100 can be mechanically coupled to the support plate 186 for mechanical, rather than electrical, reasons. For example, as shown in FIGS. 1 and 2, the switch 140 can be mechanically coupled to the support plate 186 so that the switch 140 is positioned in a certain location relative to the switch mechanism 110.

In certain example embodiments, a support device 184 creates the distance of separation between the top of the plunger 118 when the plunger 118 is in the suppressed position and the electrode 120 to exceed the arc-over threshold distance between those components. The support device 184 can be mechanically coupled at one end to the electrode 120 (or, more specifically, the top member 180) and at the other end to the bottom end of the switch mechanism 110. The support device 184 can be made of electrically non-conductive material.

The base member 182 of the arrester bypass device 100 can be mechanically coupled to the support device 184 and the second end of the ground strap 130. Thus, the base member 182 can also be coupled to ground. The base member 182 can be made of electrically non-conductive material. In some cases, as shown in FIG. 4, the base member 182 can be mechanically coupled to the secondary terminal of the arrester.

All of the various components of the arrester bypass device 100 can be mechanically coupled to each other using one or more of a number of coupling features and/or methods. Such coupling features and/or methods can include, but are not limited to, welding, fusing, snap fittings, and fastening devices (e.g., nuts and bolts, rivets).

Figure 3:
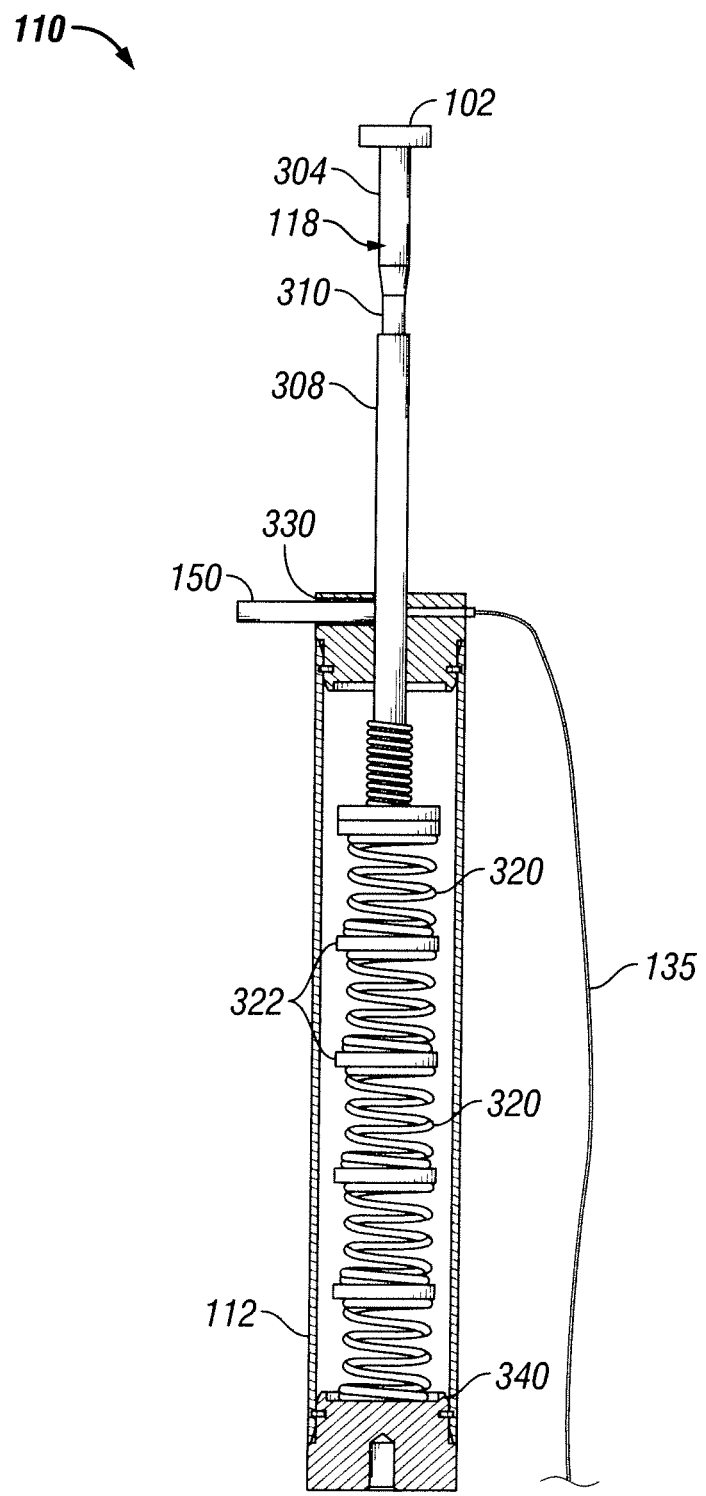
FIG. 3 shows a cross-sectional side view of a switch mechanism of an arrester bypass device in accordance with certain example embodiments.

FIG. 3 shows a cross-sectional side view of a switch mechanism 110 of an arrester bypass device in accordance with certain example embodiments. In one or more embodiments, one or more of the components shown in FIG. 3 may be omitted, added, repeated, and/or substituted. Accordingly, embodiments of a switch mechanism should not be considered limited to the specific arrangements of components shown in FIG. 3.

Referring to FIGS. 1-3, the switch mechanism 110 as shown in FIG. 3 has a plunger 118 in the actuated position. The plunger 118 can be mechanically coupled to the electrode 102, which is wider than the adjacent plunger stem 304 to which the electrode 102 is attached. Below the plunger stem 304 is a receiving feature 310 that aligns with the trigger 150 (or the switch 140 if there is no trigger 150) when the plunger 118 is in the suppressed position. The housing 112 can include an aperture 330 that traverses therethrough. In such a case, the trigger 150 and/or the switch 140 can be positioned within the aperture 330 in the housing 112 to engage the receiving feature 310 of the plunger 118.

The receiving feature 310 can have any of a number of configurations that are designed to complement the configuration of the trigger 150 and/or the switch 140. When the trigger 150 and/or switch 140 are engaged with the receiving feature 310, the spring 320 is held in place under compression. When the trigger 150 and/or switch 140 become disengaged with the receiving feature 310 (as when the switch 140 moves to the operated position), the spring 320 expands into a normal state, pushing the plunger 118 (and, thus, the electrode 102) upward.

Below the receiving feature 310 is positioned a longer plunger stem 308. The plunger stem 308 couples to a compressive spring 320 (or a number of series-connected springs 320) positioned inside the housing 112. If there are a number of series-connected springs 320, there can be a transitional element 322 between two adjacent springs 320. The other end of the spring 320 (or series of springs) is mounted to a base 340 that is mechanically coupled to the housing 112 toward the bottom end of the housing 112.

The ground strap 135, which takes the fault current from the plunger 118 to ground, is shown as, in some cases, penetrating and being affixed to the housing 112. In this example, the ground strap 135 is electrically coupled to the plunger stem 308 when the plunger 118 is in the actuated position. In certain example embodiments, the ground strap 135 is also electrically coupled to the plunger 118 when the plunger 118 is in the suppressed position.

Figure 5:
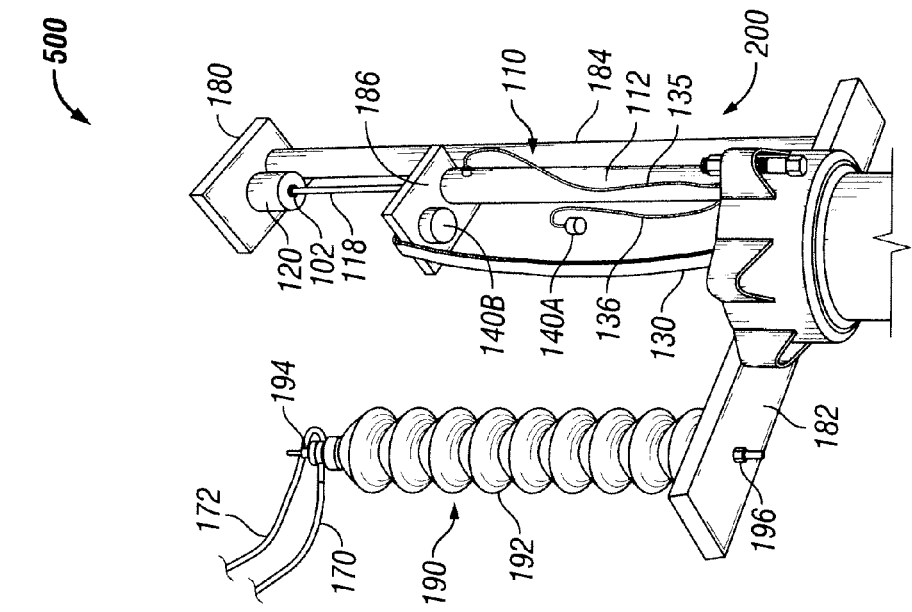
FIG. 5 shows another view of the system for bypassing the arrester of FIG. 4 in accordance with certain example embodiments.

FIGS. 4 and 5 show an example system for bypassing an arrester 190 in accordance with certain example embodiments. Specifically, FIG. 4 shows the system 400 for bypassing the arrester 190 in a normal (prior to operation) state, while FIG. 5 shows the system 500 for bypassing the arrester 190 in a post-operation state. In one or more embodiments, one or more of the components shown in FIGS. 4 and 5 may be omitted, added, repeated, and/or substituted. Accordingly, embodiments of a system for bypassing an arrester should not be considered limited to the specific arrangements of components shown in FIGS. 4 and 5.

The arrester bypass device 100 (and its various components) of FIG. 4 are substantially the same as the arrester bypass device 100 (and its corresponding components) of FIG. 1 above. Similarly, the arrester bypass device 200 (and its various components) of FIG. 5 are substantially the same as the arrester bypass device 200 (and its corresponding components) of FIG. 2 above. In certain example embodiments, the arrester 190 has a high-voltage terminal 194 and a secondary terminal 196. The high-voltage terminal 194 of the arrester 190 can be mechanically coupled to the top member 180.

The high-voltage terminal 194 of the arrester 190 can be mechanically coupled to the top member 180 using one or more of a number of devices. For example, as shown in FIG. 4, the high-voltage terminal 194 can be mechanically coupled to the top member 180 by one or more conductors 170, 172. Thus, the high-voltage terminal 194 of the arrester 190 and the electrode 120 are at the same potential.

The arrester 190 can also include a body 192 that has a height (e.g., two feet, three feet) and can be made of one or more of a number of suitable materials (e.g., porcelain). The arrester 190 can have a rating (e.g., 10 kA, 20 kA) that represents the root-mean-square (RMS) voltage at which the arrester 190 passes a duty cycle test. Put another way, the rating of the arrester 190 is associated with the level of fault current that switches the arrester 190 from an insulator to discharging the fault current.

While the fault current is flowing through the arrester 190, the switch 140 can detect the fault current. For example, the switch 140 can detect the electromagnetic field generated by the fault current flowing through the arrester 190. Alternatively, the switch 140 can detect heat generated by the fault current flowing through the arrester 190. At a certain threshold associated with the detected electric field or detected heat, the switch 140 can change to the operated position activating the bypass device.

The switch 140 of FIGS. 4 and 5 is a disconnector. When the switch 140 changes from a normal state to an operated state as a result of a detonation, the switch 140 breaks into two pieces. The first piece 140B, corresponding to the top end of the switch 140, remains coupled to the conductive strap 130 and can remain mechanically coupled to the support device 186. The second piece 140A, corresponding to the bottom end of the switch 140, remains mechanically and electrically coupled to the ground strap 136. In certain example embodiments, some or all of the ground strap 136 can be stiffened and/or coupled to a support to control where the ground strap 136 falls after the switch 140 detonates into a first piece 140B and a second piece 140A.

Field testing of example arrester bypass devices, such as the arrester bypass device shown in FIGS. 1, 2, 4, and 5, shows that the arrester bypass device can bypass an arrester when the fault current associated with the fault current is between approximately 65 A and 20 kA. Field testing also shows that the time it takes the arrester bypass device to operate and bypass an arrester can range from approximately 1 millisecond (ms) to 400 ms.

FIGS. 6A-6C shows various views of another example arrester bypass device 600 in accordance with certain example embodiments. Specifically, FIG. 6A shows a cross-sectional side perspective view of the arrester bypass device 600. FIG. 6B shows a top view of the arrester bypass device 600. FIG. 6C shows a cross-sectional side view of the arrester bypass device 600. In one or more embodiments, one or more of the components shown in FIG. 6 may be omitted, added, repeated, and/or substituted. Accordingly, embodiments of an arrester bypass device should not be considered limited to the specific arrangements of components shown in FIG. 6.

Referring to FIGS. 1-6C, the example arrester bypass device 600 of FIGS. 6A-6C is more compact than the arrester bypass device 100 described above. The arrester bypass device 600 can include a housing 695 that houses a switch 640, a switch mechanism 610, a linking device 652, a electrode 620, and a plunger 618. In certain example embodiments, the switch 640, the electrode 620, the base member 682, and the switch mechanism 610 are substantially the same as the switch 140, the electrode 120, the base member 182, and the switch mechanism 110 described above, except as denoted below.

The arrester bypass device 600 (and, more specifically, the plunger 618) shown in FIGS. 6A-6C is in the suppressed position. In this case, the plunger 618 is mechanically coupled in parallel, rather than in series as shown in FIGS. 1-5, with the switch mechanism 610. In certain example embodiments, the plunger 618 is mechanically coupled to the switch mechanism 610 using a linkage device 652. The linkage device 652 can be a solid component that is strong enough to withstand the lateral force necessary to hold the spring 614 of the switch mechanism 610 in compression. The linkage device 652 can be made of one or more of a number of suitable materials, including but not limited to stainless steel. The linkage device 652 can be coupled to the plunger 618 and the switch mechanism (or, more specifically, to the top end 613 of the spring 614) using one or more of a number of coupling methods, including but not limited to welding, compression fittings, fastening devices, and slotted fittings.

Figure 8:
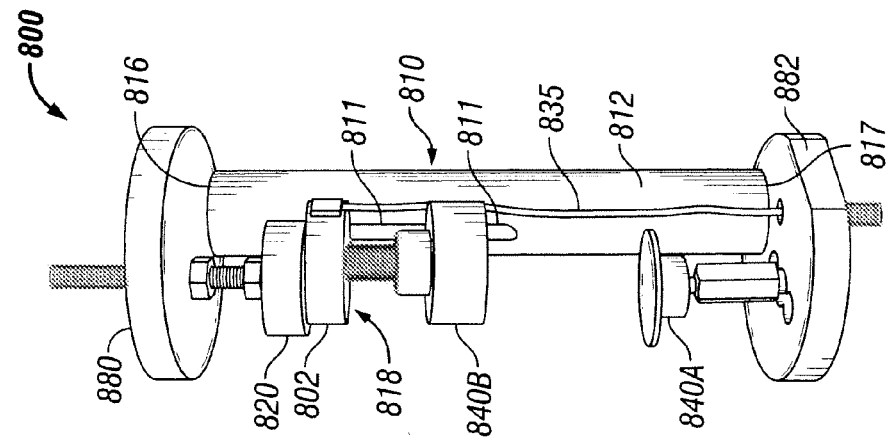
FIG. 8 shows a side view of the example arrester bypass device of FIG. 7 in an actuated position in accordance with certain example embodiments.

In this case, there is no trigger, as described above with respect to FIGS. 1-5. Rather, when the switch 640 moves from the normal state to the operated state (e.g., when the detonator in the switch 640 detonates), the switch 640 releases the shaft 604 of the plunger 618. When the shaft 604 of the plunger 618 is released by the switch 640, the compressed spring 614 of the switch mechanism 610 quickly expands to its natural state. In addition, as shown in FIG. 8, when the switch 840 moves to the operated state, and if the switch 840 is a disconnector that detonates when the switch 840 moves to the operated state, then top portion (first piece 840B) of the switch 840 can be forced upward, away from the bottom portion (second piece 840A) of the switch 840. In other words, the upward force of the detonation on the first piece 840B can help move the plunger 818 into the actuated position.

As the compressed spring 614 of the switch mechanism 610 expands to its natural state, the top end 613 of the spring 614, using the linkage device 652, draws the electrode 602 (sometimes referred to herein as the first electrode) disposed at the distal end of the plunger 618 upward toward the electrode 620 (sometimes referred to herein as the second electrode). In such a case, the wall of the housing 612 of the switch mechanism 610 can include a slot that traverses at least a portion of the height of the wall of the housing 612. For example, the slot 611 can have a lower end that corresponds to the position of the linking device 652 when the spring 614 is held under compression, and the slot can have an upper end that corresponds to the position of the linking device 652 when the electrode 602 disposed at the distal end of the plunger 618 is in contact with the electrode 620 (i.e., when the spring 614 is expanded toward its natural state after being released from compression).

The slot can have a width that is at least slightly larger than the width of the linking device 652. In such a case, the linking device 652 can freely move within the slot without impeding the progress of the linking device 652 (and, thus, the electrode 602 disposed at the distal end of the plunger 618) as the electrode 602 approaches the electrode 620.

The electrode 620 can be mechanically coupled to the top 692 of the housing 695 using attachment device 622. In such a case, the attachment device 622 can be made of an electrically conductive material for receiving the power (including the fault current) flowing through the arrester. In addition, or in the alternative, the top 692 of the housing 695 can be made of an electrically conductive material for receiving the power (including the fault current) flowing through the arrester.

The housing 612 for the switch mechanism 610 can have a top end 616 that is also disposed within, or mechanically coupled to, the top 692 of the housing 695. The top end 616 can act as a stop to limit the vertical travel of the spring 614 after the spring 614 has been released from compression.

The base member 682 of the arrester bypass device 600 can be mechanically coupled to the housing 695. If there is no bottom end of the housing 695, then the base member 682 can also be mechanically coupled to the switch 640 and/or a base 617 of the housing 612 of the switch mechanism 610. In addition, the base member 682 can also be coupled to ground. The base member 682 can be made of electrically non-conductive material.

Not shown in FIGS. 6A-6C is the ground strap, which can be mechanically coupled to the electrode 602 at one end, and to ground (e.g., the base member 682) at the other end. As in FIGS. 1-5 above, the ground strap is flexible so that the ground strap remains mechanically coupled to the electrode 602 when the plunger 618 moves from the suppressed position to the engaged position, thus moving the electrode 602 vertically upward to make contact with the electrode 620. This allows an electrical path to ground for the fault current that is being diverted from the arrester by the arrester bypass device 600. The housing 695 and the housing 612 can be made of electrically non-conductive material.

Figure 7:
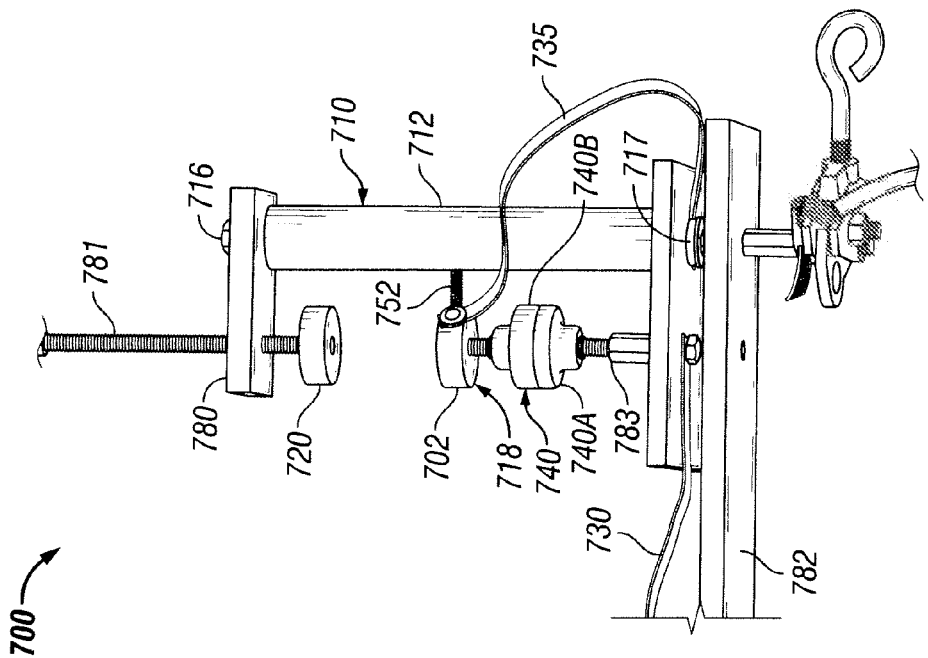
FIG. 7 shows a side view of yet another example arrester bypass device in a suppressed position in accordance with certain example embodiments.

FIG. 7 shows a side view of yet another example arrester bypass device 700 in a suppressed position in accordance with certain example embodiments. The arrester bypass device 700 of FIG. 7 is substantially similar to the arrester bypass device 600 of FIGS. 6A-6C above, except as described below. The arrester bypass device 700 of FIG. 7 does not have a housing (e.g., housing 695). In addition, the arrester bypass device 700 can include a top member 780 (substantially similar to the top member 180 of FIGS. 1-5), to which the electrode 720 and the top end 716 of the switch mechanism 710 can be mechanically coupled.

The arrester bypass device 700 shows a conductive strap 730 that is electrically and mechanically coupled to a first end of the switch 740. In addition, the arrester bypass device 700 of FIG. 7 shows the ground strap 735 that is electrically and mechanically coupled to the electrode 702 disposed at the distal end of the plunger 718 at one end and to ground (which also includes, in this case, the base 717 of the housing 712 of the switch mechanism 710) at the other end. In addition, in this case, the second end of the switch 740 is electrically and mechanically coupled to the plunger 718.

As can be seen in FIG. 7, the switch 740 is in the normal state. As a result, the spring (hidden from view by the housing 712 of the switch mechanism 710) is held in compression by the switch 740 holding the plunger 718, which is mechanically coupled to the top end of the spring by the linking device 752. Further, when the switch 740 is in the normal state, the distance between the electrode 720 (sometimes referred to herein as the second electrode) and the electrode 702 (sometimes referred to herein as the first electrode) disposed at the distal end of the plunger 718 is great enough that a voltage at the electrode 720 does not arc over (i.e., the distance exceeds the arc-over threshold distance) to the electrode 702, thus avoiding a fault condition caused by a flashover.

FIG. 7 also shows various examples of how the heights and/or relative distances between components of the arrester bypass device 700 can be adjusted to optimize performance of the arrester bypass device 700. For example, attachment device 781 in FIG. 7 is mechanically coupled to the electrode 720 and to the top member 780. The attachment device 781 can extend above and/or below the top member 780, which can allow the attachment device 781 to adjust the height of the electrode 720 relative to the electrode 702 disposed at the distal end of the plunger 718 when the plunger 718 is in the suppressed position.

As another example, the attachment device 783 in FIG. 7 is electrically and mechanically coupled to the switch 740 and the conductive strap 730. The attachment device 783 can extend above and/or below the base member 782, which can allow the attachment device 783 to adjust the height of the switch 740 (and, thus, the electrode 702 of the plunger 718).

An adjustment by the attachment device 783 can be made for when the plunger 718 is in the suppressed position and/or when the plunger 718 is in the actuated position.

FIG. 8 shows a side view of yet another example arrester bypass device 800 in an actuated position in accordance with certain example embodiments. The arrester bypass device 800 of FIG. 8 is substantially similar to the arrester bypass device 600 of FIGS. 6A-6C and the arrester bypass device 700 of FIG. 7 above, except as described below. The arrester bypass device 800 of FIG. 8, like the arrester bypass device 700 of FIG. 7, does not have a housing (e.g., housing 695). In addition, the arrester bypass device 800 can include a top member 880 (substantially similar to the top member 180 of FIGS. 1-5), to which the electrode 820 and the top end 816 of the switch mechanism 810 can be mechanically coupled.

In addition, the arrester bypass device 800 of FIG. 8 shows the ground strap 835 that is mechanically coupled to the electrode 802 disposed at the distal end of the plunger 818 at one end and to ground (which also includes, in this case, the base 817 of the housing 812 of the switch mechanism 810, the switch 840, and the at the base member 882) at the other end. As can be seen in FIG. 8, when the plunger 818 is in the actuated position, the flexibility of the ground strap 835 allows the ground strap 835 to maintain its electrical connection with both the electrode 802 disposed at the distal end of the plunger 818 and ground. As a result, the fault current can be diverted from the arrester and flow through the electrode 820 sometimes referred to herein as the second electrode) to the electrode 802 (sometimes referred to herein as the first electrode) to ground.

The slot 811 can also be clearly seen in FIG. 8. The slot 811 is shown in FIG. 8 as being substantially vertical and running along a portion of the wall of the housing 812 of the switch mechanism 810. The linking device (hidden from view), which traverses the slot 811, is mechanically coupled to the electrode 802 of the plunger 818 and to the top end of the spring of the switch mechanism 810. The linking device travels from the lower end (or approximately thereto) of the slot 811 to the upper end (or approximately thereto) of the slot 811 as the plunger 818 changes from the suppressed position to the actuated position.

Figure 9B:
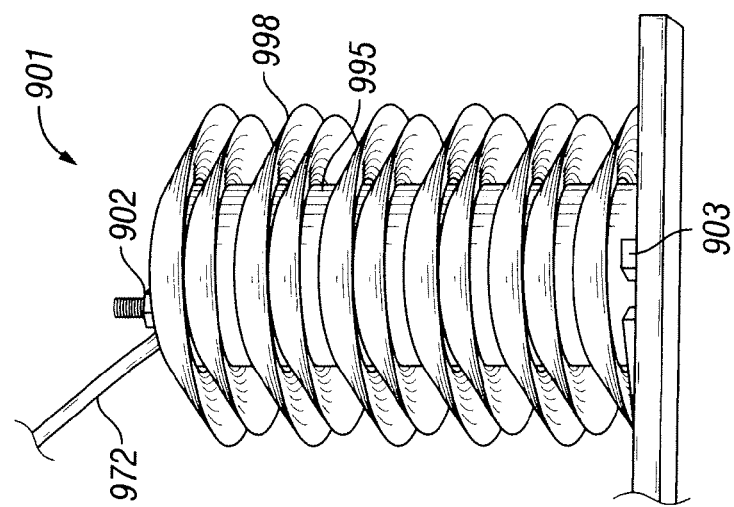
FIGS. 9A and 9B show side views of a system for bypassing an arrester using an example arrester bypass device in a suppressed position in accordance with certain example embodiments.
Figure 9A:
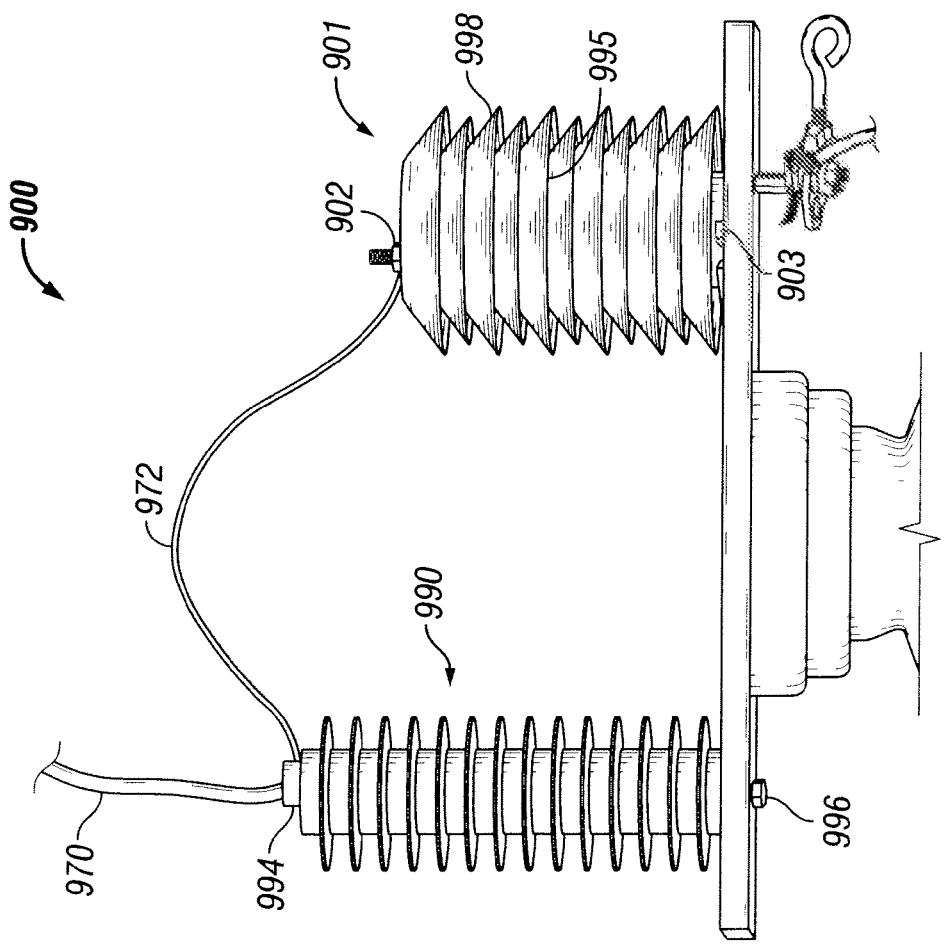

FIGS. 9A and 9B show side views of a system 900 for bypassing an arrester 990 using an example arrester bypass device 901 in accordance with certain example embodiments. Specifically, FIG. 9A shows a side view of the system 900, and FIG. 9B shows a side view of the arrester bypass device 901 from FIG. 9A. In one or more embodiments, one or more of the components shown in FIGS. 9A and 9B may be omitted, added, repeated, and/or substituted. Accordingly, embodiments of system for bypassing an arrester should not be considered limited to the specific arrangements of components shown in FIGS. 9A and 9B.

Referring to FIGS. 1-9B, the arrester bypass device 901 is substantially similar to the arrester bypass devices described above with respect to FIGS. 6A-8. Aside from the housing 995, all of the components of the arrester bypass device 901 are hidden from view. The conductor 970 is electrically and mechanically coupled to the top end 994 of the arrester 990, and another conductor 972 electrically and mechanically couples the top end 994 of the arrester 990 and to the top end 902 (and, thus, the electrode 820) of the arrester bypass device 901. The bottom end 996 of the arrester 990 and the bottom end 903 of the arrester bypass device 901 (and, more specifically, the first end of the switch 840) are electrically and mechanically coupled to each other.

In certain example embodiments, as shown in FIGS. 9A and 9B, the housing 995 of the arrester bypass device 901 can have one or more insulating features 998 disposed along the outer surface of the housing 995. Such insulating features 998 can be used for one or more of a number of purposes, including but not limited to electrical isolation of the arrester bypass device 901 from the arrester 990 and structural reinforcement of the housing 995.

Figure 10B:
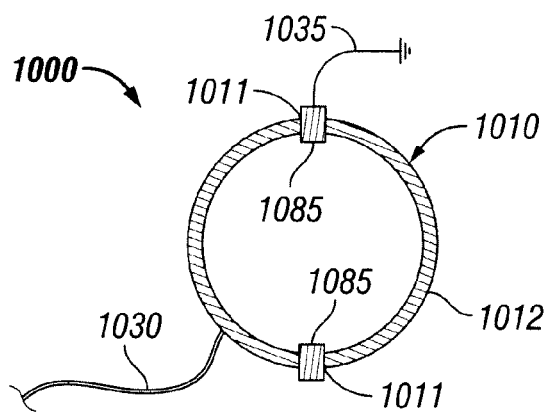
FIGS. 10A-10C show various views of still another example arrester bypass device in a suppressed position in accordance with certain example embodiments.
Figure 10A:
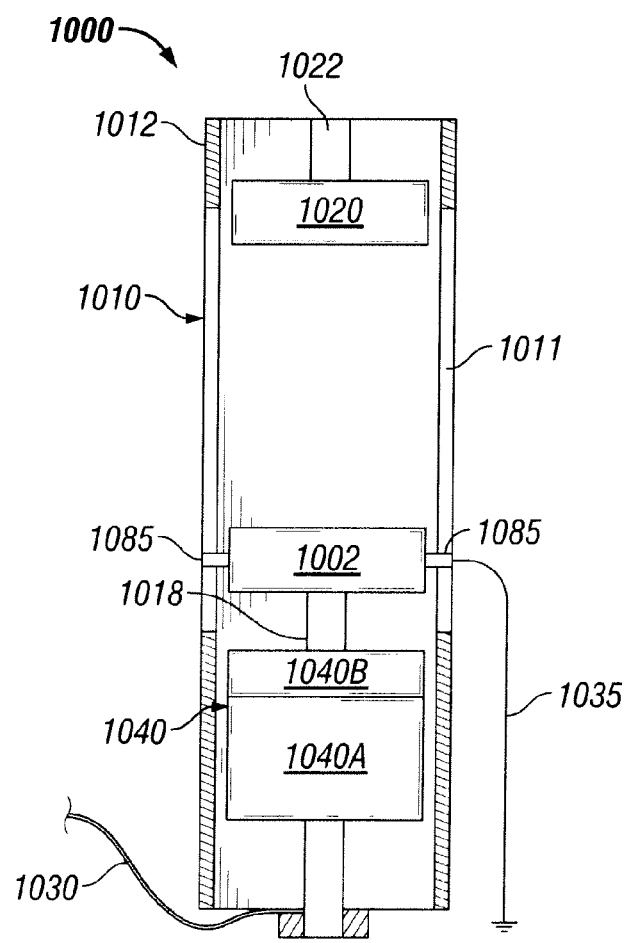
Figure 10C:
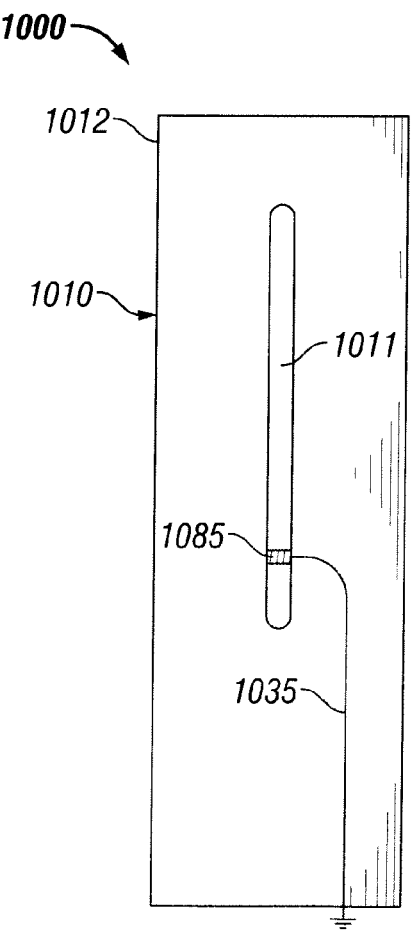
Figure 11:
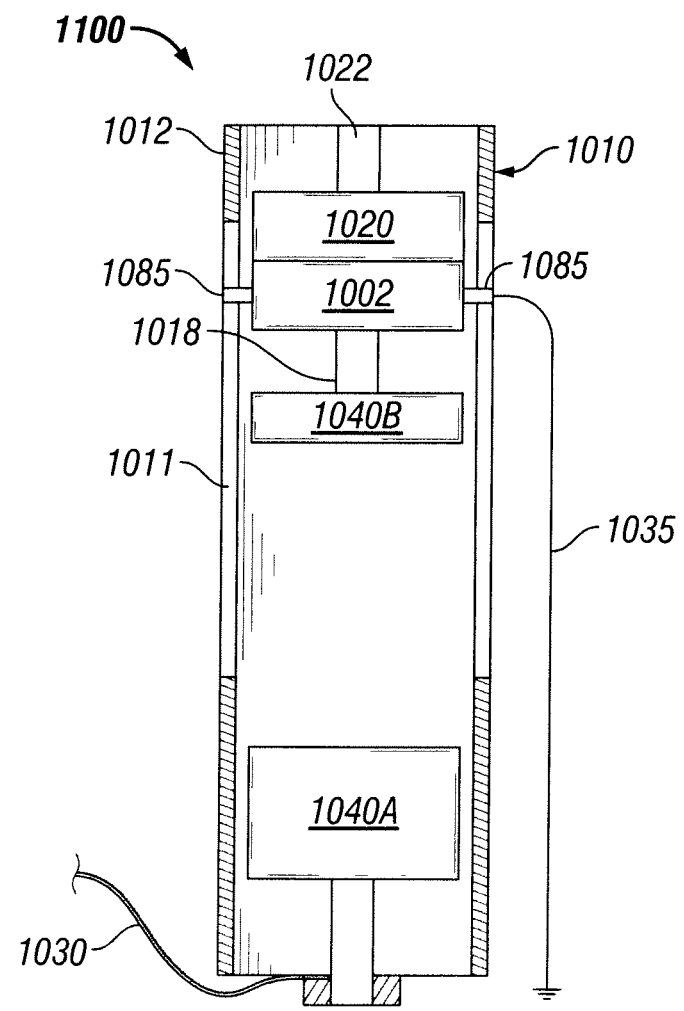
FIG. 11 shows a side view of the example arrester bypass device of FIGS. 10A-10C in an actuated position in accordance with certain example embodiments.

FIGS. 10A-10C show various views of still another example arrester bypass device 100 in a suppressed position in accordance with certain example embodiments. Specifically, FIG. 10A shows a cross-sectional side view of the arrester bypass device 1000. FIG. 10B shows a top view of the arrester bypass device 1000. FIG. 10C shows a side view of the arrester bypass device 1000. Further, FIG. 11 shows a side view of the arrester bypass device 1100 of FIGS. 10A-10C in an actuated position in accordance with certain example embodiments. In one or more embodiments, one or more of the components shown in FIGS. 10A-11 may be omitted, added, repeated, and/or substituted. Accordingly, embodiments of an arrester bypass device should not be considered limited to the specific arrangements of components shown in FIGS. 10A-11.

The components of the arrester bypass device 1000 are substantially similar to the components of the arrester bypass devices described above, except as described below. The electrode 1002 and the electrode 1020, in addition to being made of electrically conductive material, is also made of, at least in part, a magnetic material. Specifically, electrode 1002 (or at least the side facing electrode 1020) can have one magnetic polarity, and electrode 1020 (or at least the side facing electrode 1002) can have another (opposing) magnetic polarity. As explained above, electrode 1020 and electrode 1002 are spaced far enough apart when the switch 1040 is in the normal state to prevent an arc-over condition between the high voltage (electrode 1020) and ground or low voltage (electrode 1002).

However, the magnetic attraction between electrode 1002 and 1020 can be strong enough at that distance to force electrode 1002 and electrode 1020 together when the switch 1040 changes to the actuated state. In other words, when the switch 1040 changes to the actuated state, the electrode 1002, now released, is magnetically drawn to electrode 1020. In certain example embodiments, when the switch 1040 is a disconnecter and detonates, causing the switch to separate into multiple pieces (e.g., bottom end 1040A, top end 1040B), the force of the detonation can push the electrode 1002 upward toward the electrode 1020. In such a case, the magnetic force attracting electrode 1002 and electrode 1020 together may be too small at the distance that separates them when the switch 1040 is in the normal state. However, when the switch 1040 detonates (changes to the operated state), the distance between electrode 1002 and electrode 1020 decreases, which can cause the magnetic force to become strong enough to attract electrode 1002 and electrode 1020 together.

In certain example embodiments, a housing 1010 can be used to house the electrode 1020 (sometimes referred to herein as the second electrode), the electrode 1002 (sometimes referred to herein as the first electrode), and, optionally, some or all of the switch 1040. The housing 1010 can have one or more walls 1012 and have a cross-sectional shape that is substantially similar to the cross-sectional shape of the electrode 1020 and/or the electrode 1002. The housing 1010 can be used to guide the electrode 1002 on a proper path toward the electrode 1020 so that electrode 1002 and electrode 1020 couple to each other when the switch 1040 changes to the operated state.

In some cases, the housing 1010 and/or the electrode 1002 can include one or more features that guide the electrode 1002 along a certain path toward the electrode 1020. For example, as shown in FIGS. 10A-10C, the wall 1012 can have one or more slots 1011 that traverse the wall 1012 and extend along at least a portion of the height of the wall 1012. Similarly, the electrode 1002 can include one or more guides 1085 disposed on an outer perimeter of the electrode 1002. These guides 1085 can have a location, size, and shape that positions them within the slots 1011 disposed in the wall 1012 of the housing 1010.

In this example, there is no switch mechanism, as described above. Instead, the magnetic force and attraction between electrode 1002 and electrode 1020 take the place of the switch mechanism, providing the force required to draw electrode 1002 to electrode 1020. As with the example embodiment shown in FIGS. 6A-8, there is only one ground strap 1035 that electrically and mechanically couples to the electrode 1002. There is enough slack and flexibility in the ground strap 1035 to allow the ground strap 1035 to remain electrically and mechanically coupled to the electrode 1002, regardless of whether the switch 1040 is in the normal state or the operated state. Similarly, the conductive strap 1030 electrically couples the secondary terminal of the arrester (not shown) to the bottom end 1040A of the switch 1040.

While the preceding example embodiments are shown and described as having an electrode (e.g., electrode 102) at zero or low voltage traveling toward an electrode (e.g., electrode 120) at high voltage, the opposite can be done using example embodiments. Specifically, the switch can cause the electrode (e.g., electrode 120) at high voltage travel toward the other electrode (e.g., electrode 102), which is at zero or low voltage. In such a case, the switch can detect the fault current based on the fault current flowing through the arrester (as shown and described above). Alternatively, the switch can detect the fault current at the high voltage terminal, independent of the arrester.

Figure 12:
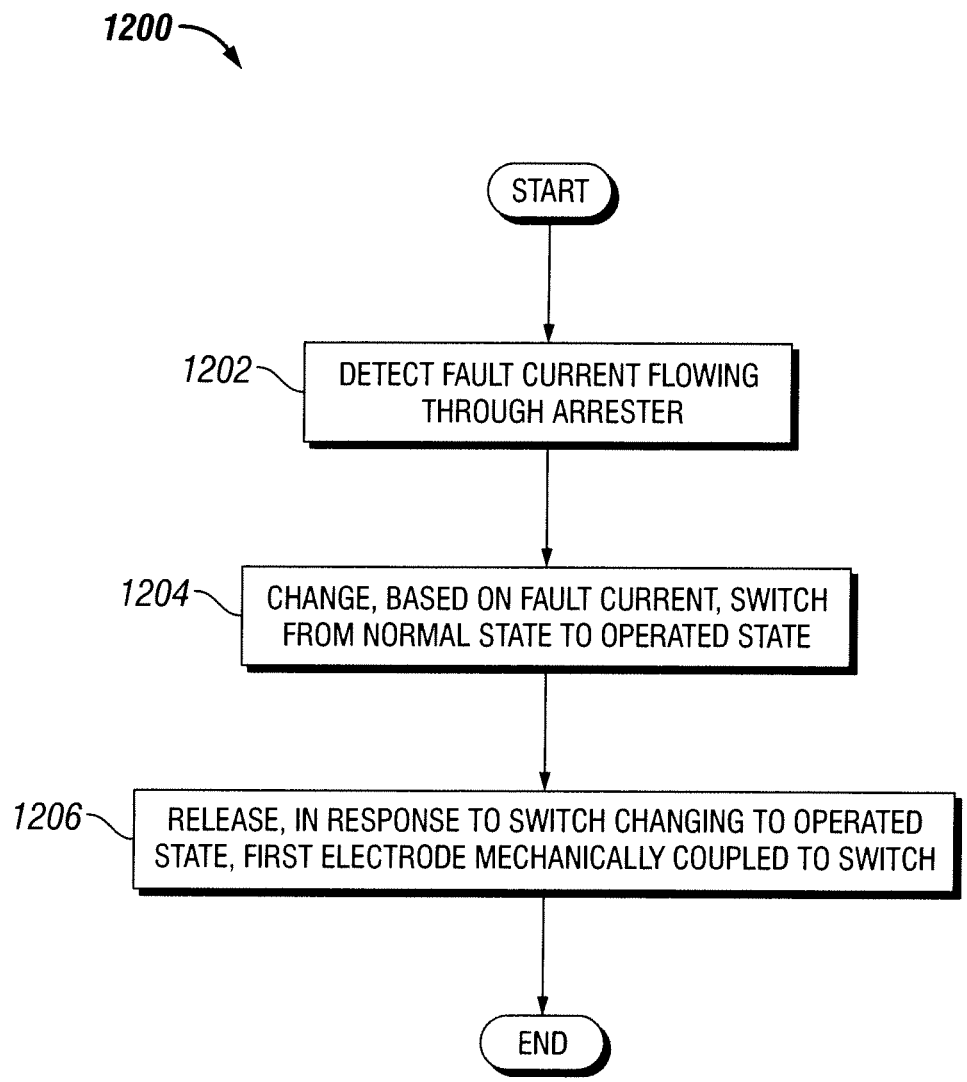
FIG. 12 shows a flow chart of a method for bypassing an arrester in accordance with certain example embodiments.

FIG. 12 is a flow chart presenting a method 1200 for bypassing an arrester in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order. In addition, a person of ordinary skill in the art will appreciate that additional steps not shown in FIG. 12 may be included in performing this method. Accordingly, the specific arrangement of steps should not be construed as limiting the scope.

Referring now to FIGS. 1-12, the example method 1200 begins at the START step and proceeds to step 1202, where a fault current flowing through the arrester 190 is detected. In certain example embodiments, the fault current is detected by the switch 740. Prior to the time that the fault current is detected by the switch 740, the switch 740 is in the normal state. The fault current can be detected in one or more of a number of ways by the switch 740. For example, a fault current flowing through the arrester 190 can further flow through a conductive strap 730, electrically and mechanically coupled to a secondary terminal 196 of the arrester 190 and a first end of the switch 740. The switch 740 can include a grading component that detects a voltage drop during a fault condition.

In step 1204, the switch 740 is changed from the normal state to the operated state. In certain example embodiments, the switch 740 changes to the operated state based on the fault current. For example, the switch 740 can change from the normal state to the operated state based on an amount of heat generated (for example, across the grading component of the switch 740) as a result of the fault current. In other words, the switch 740 changes from the normal state to the operated position based on the switch 740 detecting the fault current. The switch 740 can change from the normal state to the operated state when a detonation device within the switch 740 detonates, where such detonation occurs in response to detecting the fault current flowing through the arrester 190.

In step 1206, the electrode 102, 702, 1002 coupled to the switch 140, 740, 1040 is released. In certain example embodiments, the electrode 102, 702, 1002 is released in response to the switch 740 changing to the operated state. The electrode 102, 702, 1002 can be disposed at the distal end of the plunger 718. In such a case, the plunger 718 can be actuated and drive the electrode 102, 702, 1002 toward the electrode 120, 720, 1020.

The plunger 718 can be actuated in one or more of a number of ways. For example, the plunger 718 can be actuated directly when the switch 740 changes from the normal state to the operated state. In the normal state, the switch 740 holds the plunger 718 stationary, which keeps the spring 614 under compression through the linking device 652 that is coupled to both the top end 613 of the spring 614 and the electrode 602 disposed at the distal end of the plunger 618. In the operated state, the switch 740 releases the plunger 718, which can in turn release the spring 614 from compression within the optional switch mechanism 610. When the spring 614 is released from compression, the plunger 618 is released from a suppressed position to the actuated position.

As another example, the spring 320 can be released from compression when a trigger 150, holding the spring 320 (directly using the trigger 150 or indirectly) in compression, is broken (or otherwise dislodged, altered, and/or moved). The trigger 150 can be broken (or otherwise dislodged, altered, and/or moved) in response to a detonation of a detonator in the switch 140 triggered by the switch 140 changing to the operated state.

When the plunger 118, 818 is actuated, the plunger 118, 818 moves into the actuated position brings the electrode 102, 702, 1002 into contact with the electrode 120, 820, 1020. When the electrode 102, 802, 1002 contacts the electrode 120, 820, 1020, the fault current is diverted from the arrester 190, 990 to the electrode 120, 720, 1020 to the electrode 102, 702, 1002, on to the ground strap 135, 835, where the ground strap 135, 835 is electrically coupled to ground.

As another example, when the electrode 1002 is released by the switch 1040, a magnetic force can attract the electrode 1002 toward the electrode 1020. When the switch 1040 releases the electrode 1002, the force of a detonation caused by the switch 1040 changing to the operated state can bring the electrode 1002 in close enough proximity to the electrode 1020 to enable the magnetic force to bring electrode 1002 and electrode 1020 together. Alternatively, the electrode 1002 and electrode 1020 can be in close enough proximity, when the switch 1040 is in the normal state, so that the magnetic force brings electrode 1002 and electrode 1020 together without further assistance. After step 1206 is complete, the process can proceed to the END step.

Using example arrester bypass devices described herein reduces or eliminates the risk of collateral damage caused by a fault current flowing excessively through an arrester.

Example arrester bypass devices divert a fault current away from the arrester once the fault current has been detected. The example arrester bypass devices described herein act quickly so that the amount of time that the fault current travels through the arrester is minimized.

The arrester bypass devices described herein allow arresters to pass one or more of a number of standards and/or regulations, particularly those (e.g., AS1307.2 (1996), IEC 60099-4 Ed 2.2 (2009), California Fire Exemption Test from Public Resources Code Section 4292) that address the risk of grass fire and other collateral damage that can be caused by too much fault current flowing through an arrester. The range of fault currents that can cause example arrester bypass devices to operate be between approximately 65 A and 20 kA.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An arrester bypass device, comprising:
    a switch having a normal state and an operated state;
    a plunger coupled to the switch, wherein the plunger has a suppressed position and an actuated position, wherein the plunger is held in the suppressed position when the switch is in the normal state, and wherein the plunger is released to the actuated position when the switch enters the operated state;
    a first electrode mechanically coupled to a distal end of the plunger;
    a second electrode positioned in line with the first electrode, wherein the second electrode is electrically coupled to a high voltage conductor and a high voltage terminal of an arrester, wherein the first electrode is separated from the second electrode when the switch is in the normal state, and wherein the first electrode contacts the second electrode when the switch is in the operated state; and
    a first ground strap comprising a first end and a second end, wherein the first end is electrically coupled to the first electrode, and wherein the second end is electrically coupled to an electrical ground and to the secondary terminal of the arrester,
    wherein the switch changes to the operated state upon detecting a fault current flowing through the arrester,
    wherein the fault current flows through the second electrode, the first electrode, and the first ground strap,
    wherein the fault current bypasses the arrester and the switch when the plunger is in the actuated position, and
    wherein the switch further comprises a first end and a second end, wherein the first end of the switch is electrically coupled to the electrical ground, wherein the second end of the switch is mechanically coupled to the plunger, wherein the first end of the switch and the second end of the switch physically separate from each other when the switch changes from the normal state to the operated state.

2. The arrester bypass device of claim 1, further comprising:
    a housing inside of which are disposed, at least, the plunger, the first electrode, and the second electrode, wherein the housing comprises at least one feature that guides the first electrode toward the second electrode when the switch changes to the operated state and the plunger is released.

3. The arrester bypass device of claim 2, wherein the first electrode has a first magnetic polarity, wherein the second electrode has a second magnetic polarity, and wherein the first electrode, when the plunger is released by the switch, is attracted to the second electrode using the first magnetic polarity and the second magnetic polarity.

4. The arrester bypass device of claim 1, further comprising:
    a switch mechanism mechanically coupled to the switch, wherein at least a portion of the plunger is disposed within a housing of the switch mechanism when the plunger is in the suppressed position; and
    a second ground strap electrically coupled to the first end of the switch and to the electrical ground.

5. The arrester bypass device of claim 4, wherein the switch mechanism comprises a spring, wherein the spring is held under compression when the plunger is in the suppressed position, wherein spring is released when the switch changes to the operated state, and wherein the plunger moves into the actuated position by the spring when the spring is released.

6. The arrester bypass device of claim 4, wherein the plunger remains in the actuated position, holding the first electrode against the second electrode, after the switch changes to the operated state.

7. The arrester bypass device of claim 1, wherein the switch comprises a grading component, wherein the switch changes from the normal state to the operated state based on a voltage drop across the grading component.

8. The arrester bypass device of claim 1, further comprising:
    a trigger coupled to the switch and the plunger, wherein the switch changes from the normal state to the operated state based on a temperature of the switch by detonating when the temperature of the switch exceeds a threshold temperature, wherein the trigger separates into multiple pieces when the switch changes to the operated state, thereby releasing the plunger to the actuated position.

9. The arrester bypass device of claim 1, wherein the first electrode is separated from the second electrode by a distance when the switch is in the normal state, wherein the distance exceeds an arc-over threshold distance between the first electrode and the second electrode.

10. The arrester bypass device of claim 1, wherein the first electrode, the second electrode, the plunger, and the first ground strap are each sized to withstand the fault current.

11. A system for bypassing an arrester during a fault current, the system comprising:
    the arrester comprising a high-voltage terminal and a secondary terminal;
    an arrester bypass device mechanically coupled to the secondary terminal of the arrester, the arrester bypass device comprising:
        a switch having a normal state and an operated state;
        a plunger coupled to the switch, wherein the plunger has a suppressed position and an actuated position, wherein the plunger is held in the suppressed position when the switch is in the normal state, and wherein the plunger is released to the actuated position when the switch enters the operated state;
a first electrode mechanically coupled to a distal end of the plunger;
a second electrode positioned in line with the first electrode, wherein the second electrode is electrically coupled to a high voltage conductor and the high voltage terminal of the arrester, wherein the first electrode is separated from the second electrode when the switch is in the normal state, and wherein the first electrode contacts the second electrode when the switch is in the operated state; and
a ground strap comprising a first end and a second end, wherein the first end of the ground strap is electrically coupled to the first electrode, and wherein the second end of the ground strap is electrically coupled to an electrical ground and to the secondary terminal of the arrester,
wherein the switch changes to the operated state upon detecting the fault current flowing through the arrester,
wherein the fault current flows through the second electrode, the first electrode, and the ground strap of the arrester bypass device,
wherein the fault current bypasses the arrester and the switch when the plunger is in the actuated position, and wherein the switch further comprises a first end and a second end, wherein the first end of the switch is electrically coupled to the electrical ground, wherein the second end of the switch is mechanically coupled to the plunger, wherein the first end of the switch and the second end of the switch physically separate from each other when the switch changes from the normal state to the operated state.

12. The system of claim 11, further comprising:
a trigger mechanically coupled to the switch and to the plunger, wherein when the switch is in the normal state the trigger maintains the plunger in a suppressed position, and wherein when the switch is in the operated state the trigger releases the plunger to an actuated position.

13. The system of claim 11, further comprising:
a linking device mechanically coupled to the plunger and to a switch mechanism, wherein the linking device traverses a slot in a housing of the switch mechanism when the plunger changes from a suppressed position to an actuated position.

14. The system of claim 11, wherein the second electrode is electrically coupled to a conductor through which the fault current travels.

* * * * *